Nov. 10, 1953   E. C. CARREIRO   2,658,218
FOUNTAIN-TYPE SURFACE WASHING AND WIPING SPONGE
Filed Oct. 16, 1950
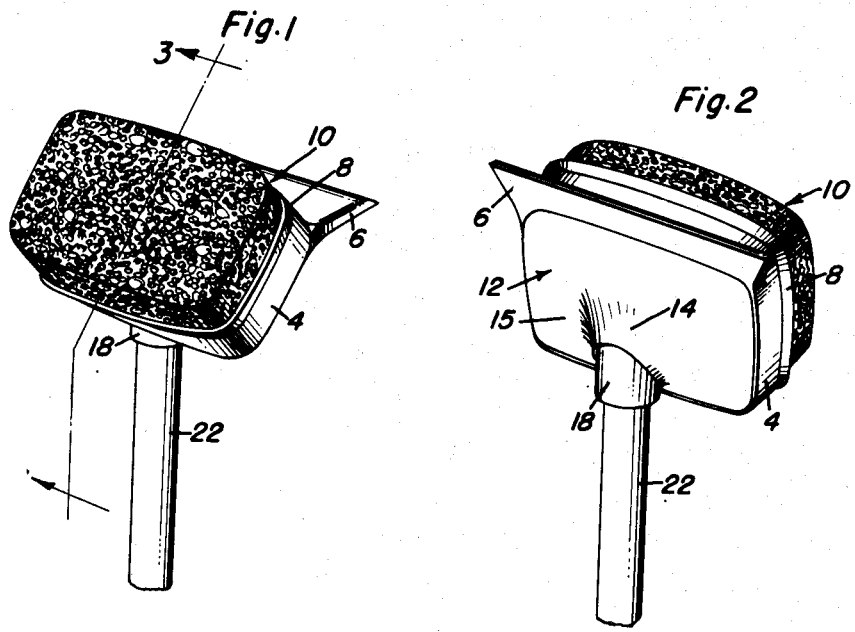
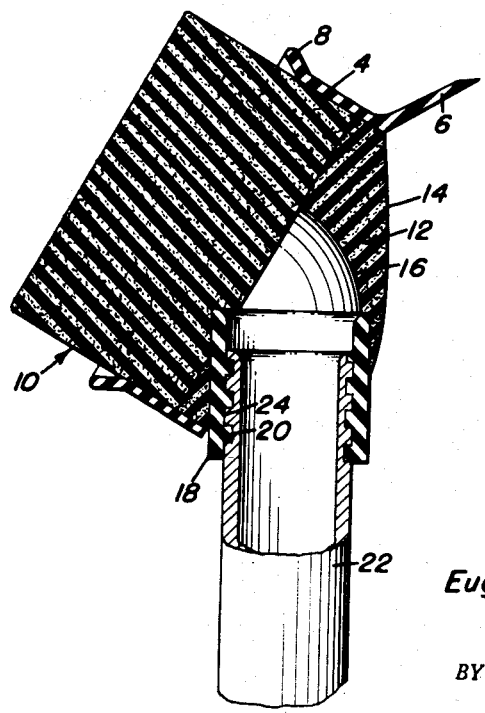
Eugenio C. Carreiro
INVENTOR.

Patented Nov. 10, 1953

2,658,218

UNITED STATES PATENT OFFICE 2,658,218

FOUNTAIN-TYPE SURFACE WASHING AND WIPING SPONGE

Eugenio C. Carreiro, Cambridge, Mass.

Application October 16, 1950, Serial No. 190,379

1 Claim. (Cl. 15—130)

The present invention relates to certain new and useful improvements in fountain-type sponges and has more particular reference to a sponge which may be conveniently and satisfactorily used to enable one to wash and wipe surfaces of windows, walls, automobiles and the like.

Another object of the invention is to provide a fountain sponge in which manufacturers, retailers and users will find their essential needs and requirements fully met and effectually available.

A further object of the invention is to provide a composite head construction characterized by a frame having a sponge fitted therein, a handle to which a garden hose may be attached and novel means for communicatively joining the discharge end of the handle with the sponge, said means constituting a flexible joint between the handle and composite head construction and allowing the latter to angle itself in variable directions in respect to the handle, whereby to promote convenient and satisfactory manipulation of the sponge.

Briefly summarized, the head construction is characterized by a hard rubber or equivalent frame having an outstanding integral squeegee-blade, a sponge of desired porosity telescopically fitted and retained in the frame and projecting from the working side of the latter and a filler block or insert fitted into the opposite side of the rim and having a passage for water to wet the sponge and further having a handle attaching and accommodating ferrule which is suitably connected to the filler block in communicative relation with the passage.

Other objects and advantages will become more readily apparent from the following description and the accompanying sheet of illustrative drawings.

In the accompanying sheet of drawings wherein like numerals are employed to designate like parts throughout the views:

Figure 1 is a perspective view of a washing and wiping fountain-type brush constructed in accordance with the principles of the invention, the handle being fragmentarily shown;

Figure 2 is another perspective view showing the rearward or reverse side of the head; and, Figure 3 is an enlarged view in section and elevation taken approximately on the plane of the line 3—3 of Figure 1, looking in the direction of the arrows.

The novel head construction is perhaps best shown in Figure 3 where it will be observed that the same is in the form of a cup. The main portion of the cup is a hard rubber or equivalent rigid endless rectangular frame or rim 4 which is provided on its rearward side with an obtuse angled flange 6 fashioned into an appropriate squeegee or wiping blade. The opposite forward edge portion of the rim has an outwardly flaring lip 8. The lip completely surrounds the rim as shown in Figures 1 and 2. The washing member takes the form of a rectangular sponge 10. This has its inward half portion telescopically fitted within the encompassing confines of and suitably secured to said frame 4. The outward half portion projects beyond the lip 8. The insert or filler block is denoted by the numeral 12 and this is conformable in marginal shape with and is telescopically fitted into the rearward side of the frame and secured to the latter in any suitable manner. This block is also of sponge rubber of appropriate porosity. It is also of a marginal shape and size conformable with the frame and the major portion thereof is fitted telescopically within the encircling or encompassing confines of said frame and is suitably secured to the latter. The inward surface of the cooperating half portion of the sponge 10 is flat and the portion of the filler block 12 which is fitted into the frame is also flat, and these two flat surfaces are in firm and abutting contact with each other as is brought out clearly in Figure 3. When the filler block becomes wet, that is, fully saturated with water, it thus distributes the water so that it completely wets the sponge, thus uniformly saturating the sponge 10. To prevent the water from seeping out of the rearward or exterior side of the filler block, the entire exposed rearward surface of said block is coated with an appropriate waterproofing preparation or compound. This coating also covers the somewhat centrally disposed laterally projecting extension 14 which is here described as a neck-like extension. The opening in this extension registers with a cooperating opening 16 which passes completely through the filler block from back to front and therefore permits the incoming stream of water to impinge or play directly against the cooperating flat surface of the sponge 10, all as clearly disclosed in Figure 3. There is a hard rubber or equivalent rigid ferrule 18 provided and this is embedded in the filler block but preferably registers with and is attached to the neck-like extension in alignment with the passage 16. This ferrule 18 is internally screw threaded as at 20 in Figure 3. The handle is rigid and tubular and of any suitable length and material and it is denoted by the numeral 22 and it has a screw threaded end portion 24 which is screwed into the threads of the ferrule so as to in this manner separably couple the handle with the over-all head construction. In the circumstances, a satisfactory construction is provided for supplying the water to the filler block and also to the sponge for satisfactory distribution and proper application to the surface to be mopped and washed. More importantly, this coupled connection between the handle and ferrule and filler block is desirable because it provides the desired flexible properties and allows the head and handle to be angled in respect to each other in variable directions for convenient and unrestrained sponging results.

In practice, a hose (not shown) is connected to the handle 22 and water is turned on ever so slowly. The water passes through the handle and into the passage 16 and saturates that portion of the sponge against which it flows. It also saturates that portion of the filler block which is confined within the rim, thus spreading and distributing the water to render the over-all sponge 10 effective. Since the exterior side of the filler block is coated with a suitable waterproofing compound, water is prevented from leaking through this coated side of the filler, as is clear. Not only does the filler wet and effectively supply the sponge with water, but it also provides an effective flexible joint or coupling between the handle and the head as a unit. That is to say, the head may be flexed and angled in respect to the handle to permit the same to be pressed against the surface being washed to best advantage and without difficulties, especially in places on automobile surfaces where a rigidly connected handle would promote hardships.

Not only does the novel head function to expedite wetting, sponging and mopping, it presents too a squeegee for wiping surplus water from the surface acted on.

Minor changes in shape, size, materials and rearrangement of parts may be resorted to in actual practice provided no departure is made from the invention as claimed.

Having described the invention, what is claimed as new is:

A fountain-type surface sponging device comprising, in combination, a composite head construction embodying a rigid endless frame, a sponge corresponding in shape to said frame, the inward half portion of said sponge fitting telescopically within the marginally encircling confines of and being secured to said frame, the outward half portion of said sponge projecting forwardly beyond the cooperating forward portions of said frame, a sponge rubber filler block of a marginal shape conformable with and having a portion fitted telescopically within said frame and secured to the latter, the inward surface of said sponge being flat and the forward surface of said filler block being flat and abutting said inward surface, the entire exposed rearward surface of said filler block being coated with a waterproof compound, the said filler block having a water intake passage extending therethrough and communicating with said sponge and also having an outstanding integral neck-like extension in communication with said passage, an internally screw-threaded ferrule joined with said extension and in registration with said passage, and a rigid hollow handle having a screw-threaded end portion screwed into said ferrule, whereby to provide a flexible joint between said handle and head construction.

EUGENIO C. CARREIRO.

References Cited in the file of this patent

UNITED STATES PATENTS

| Number | Name | Date |
| --- | --- | --- |
| 467,778 | Clair | Jan. 26, 1892 |
| 1,778,121 | Paull | Oct. 14, 1930 |
| 1,924,386 | Wallenbeck | Aug. 29, 1933 |
| 1,978,633 | Horton et al. | Oct. 30, 1934 |
| 2,116,864 | Fehrenbach | May 10, 1938 |
| 2,155,462 | Anderson | Apr. 25, 1939 |
| 2,212,513 | Dietrich et al. | Aug. 27, 1940 |
| 2,230,489 | Grossfield et al. | Feb. 4, 1941 |
| 2,230,583 | Borden | Feb. 4, 1941 |
| 2,237,793 | Rudd | Apr. 8, 1941 |
| 2,250,909 | Habeck | July 29, 1941 |
| 2,262,166 | Cooley | Nov. 11, 1941 |
| 2,288,353 | Hiatt | June 30, 1942 |
| 2,506,077 | Goldsmith | May 2, 1950 |